United States Patent [19]

Bianca

[11] 3,945,876

[45] Mar. 23, 1976

[54] BONDING WITH POLYISOCYANATES

[75] Inventor: Dominick Bianca, Wilmington, Del.

[73] Assignee: E. I. DuPont de Nemours & Company, Wilmington, Del.

[22] Filed: Apr. 7, 1972

[21] Appl. No.: 242,224

[52] U.S. Cl. ........ 156/331; 260/75 NP; 260/75 TN; 260/77.5 AN; 428/424
[51] Int. Cl.$^2$ ............................................. C09J 3/00
[58] Field of Search ......... 117/72, DIG. 7; 156/331, 156/332; 161/188, 190; 260/40 TN, 75 NP, 75 TN, 77.5 AN

[56] References Cited
UNITED STATES PATENTS

| | | | |
|---|---|---|---|
| 2,998,403 | 8/1961 | Muller et al. | 260/75 X |
| 3,188,302 | 6/1965 | Lorenz | 360/77.5 |
| 3,396,210 | 8/1968 | McKillip et al. | 260/859 |
| 3,644,569 | 2/1972 | Pietsch et al. | 260/835 |
| 3,684,639 | 8/1972 | Keberle et al. | 161/87 |

Primary Examiner—William A. Powell
Assistant Examiner—J. J. Gallagher

[57] ABSTRACT

A segmented thermoplastic copolyester containing intralinear long chain and short chain ester units is bonded to a fiber-forming condensation polymer or regenerated cellulose by reaction with a polyisocyanate reaction product, having an available isocyanato group content of at least 2 percent, at elevated temperature and/or elevated pressure.

16 Claims, No Drawings

BONDING WITH POLYISOCYANATES

BACKGROUND OF THE INVENTION

High molecular weight copolyesters prepared from dicarboxylic acids or their esters and mixtures of long chain glycols and low molecular weight diols are thermoplastic and exhibit elastomeric properties. These materials have good low temperature properties, high abrasion resistance and extremely good hydrolytic stability and resistance to many organic fluids in addition to useful physical properties at ambient and elevated temperatures. Because of their thermoplastic nature, these copolyesters can be processed by substantially any procedure used for thermoplastics in general. Their good thermal stability and low melt viscosities provide outstanding processing safety.

It has been found, however, that the preparation of composite structures from these copolyesters wherein it is desirable to adhere or bond the copolyester to substrates such as fiber forming condensation polymers and regenerated cellulose is complicated by the fact that the copolyesters have limited affinity for materials such as polyesters e.g. poly(ethyleneterephthalate) and polyamides e.g. poly(hexamethylene adipamide). In order to take advantage of the properties and processability of this class of copolyesters in composite structures, convenient and economical means for adhering the copolyesters to the above-described substrates is needed.

SUMMARY OF THE INVENTION

According to this invention a method has been devised for bonding the thermoplastic copolyester to a substrate which is either a fiber-forming condensation polymer or regenerated cellulose e.g. rayon. The method comprises applying to the surface of said copolyester and/or the surface of said substrate a polyisocyanate reaction product having an available isocyanato group content of at least 2 percent and is obtained by reacting an excess of polyisocyanate with a polyol or a polyamine having an equivalent weight of about 30 to 2000. The bonding or joining of the copolyester takes place through the action of elevated temperature and/or elevated pressure, after the copolyester and substrate are contacted.

The thermoplastic copolyester which is to be joined to the substrate by the process of the instant invention consists essentially of a multiplicity of recurring intralinear long-chain and short chain ester units connected head-to-tail through ester linkages, said long-chain ester units being represented by the following structure:

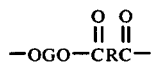    (a)

and said short-chain ester units being represented by the following structure:

    (b), wherein:
G is a divalent radical remaining after removal of terminal hydroxyl groups from poly(alkylene oxide) glycol having a carbon-to-oxygen ratio of about 2.0–4.3 and molecular weight between about 400 and 6000;

R is a divalent radical remaining after removal of carboxyl groups from a dicarboxylic acid having a molecular weight less than about 300; and D is a divalent radical remaining after removal of hydroxyl groups from a low molecular weight diol having a molecular weight less than about 250, with the provisos that the short-chain ester units constitute about 15–95% by weight of the copolyester and, ergo, the long-chain ester units constitute about 5 to 85% by weight of the copolyester; at least about 50% of the short-chain ester units must be identical and a homopolymer in the fiberforming molecular weight range (>5000) consisting of the identical short-chain ester units must melt at, at least, 150°C.

DETAILED DESCRIPTION

The term "long-chain ester units" as applied to units in a polymer chain refers to the reaction product of a long-chain glycol with a dicarboxylic acid. Such "long-chain ester units," which are a repeating unit in the copolyesters of this invention, correspond to formula (a) above. The long-chain glycols are polymeric glycols having terminal (or as nearly terminal as possible) hydroxy groups and a molecular weight from about 400–6000. The long-chain glycols used to prepare the copolyesters of this invention are poly(alkylene oxide) glycols having a carbon-to-oxygen ratio of about 2.0–4.3.

Representative long-chain glycols are poly(ethylene oxide) glycol, poly(1,2- and 1,3-propylene oxide) glycol, poly-(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are acyclic, alicyclic, and aromatic dihydroxy compounds. Preferred are diols with 2–15 carbon atoms such as ethylene, propylene, tetramethylene, pentamethylene, 2,2-dimethyl-trimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain and substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and C$_1$-C$_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8–16 carbon atoms are preferred, particularly the phenylene dicarboxylic acids, i.e., phthalic, terephthalic and isophthalic acids and their dimethyl derivatives.

It is essential that at least about 50% of the short segments are identical and that the identical segments form a homopolymer in the fiber-forming molecular weight range (molecular weight >5000) having a melting point of at least about 150°C. and preferably greater than 200°C. Polymers meeting these requirements exhibit a useful level of properties such as tensile strength and tear strength. Polymer melting points are conveniently determined by differential scanning calorimetry.

The short-chain ester units will constitute about 15–95 weight per cent of the copolyester. The remainder of the copolyester will be the long segments, ergo the long segment will comprise about 5–85 weight per cent of the copolyester.

Most preferred copolyesters which are bonded by the process of this invention are those prepared from dimethyl terephthalate, 1,4-butanediol, and poly(tetramethylene oxide) glycol having a molecular weight of about 600–2000 or poly(ethylene oxide) glycol having a molecular weight of about 600–1500. Optionally, up to about 30 mole % and preferably 5–20 mole % of the dimethyl terephthalate in these polymers can be replaced by dimethyl phthalate or dimethyl isophthalate. Other preferred copolyesters are those prepared from dimethyl terephthalate, 1,4-butanediol, and poly(1,2-propylene oxide) glycol having a molecular weight of about 600–1600. Up to 30 mole % and preferably 10–25 mole % of the dimethyl terephthalate can be replaced with dimethyl isophthalate or butanediol can be replaced with neopentyl glycol until up to about 30% and preferably 10–25% of the short chain ester units are derived from neopentyl glycol in these poly(propylene oxide) glycol polymers. The polymers based on poly(tetramethylene oxide) glycol are especially preferred because they are easily prepared, have overall superior physical properties, and are particularly resistant to water.

The dicarboxylic acids or their derivatives and the polymeric glycol and incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of dial incorporated is still the difference between moles of diacid and polymeric glycol.

The polymers described herein can be made conveniently by a conventional ester interchange reaction.

A preferred procedure involves heating the dimethyl ester of terephthalic acid with a long chain glycol and a molar excess of 1,4-butane diol in the presence of a catalyst at about 150°–260°C. and a pressure of 0.5 to 5 atmospheres, preferably ambient pressure, while distilling off methanol formed by the ester interchange. Depending on temperature, catalyst, glycol excess and equipment, this reaction can be completed within a few minutes, e.g., about 2 minutes, to a few hours, e.g., about 2 hours.

Concerning the molar ratio of reactants, at least about 1.1 mol of diol should be present for each mol of acid, preferably at least about 1.25 mol of diol for each mol of acid. The long chain glycol should be present in the amount of about 0.0025 to 0.85 mol per mol of dicarboxylic acid, preferably 0.01 to 0.6 mol per mol of acid.

This procedure results in the preparation of a low molecular weight prepolymer which can be carried to the high molecular weight copolyether of this invention by the procedure described below. Such prepolymers can also be prepared by a number of alternate esterification or ester interchange processes; for example, the long chain glycol can be reacted with a high or low molecular weight short chain ester homopolymer or copolymer in the presence of a catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long chain glycol.

The resulting polymer is then carried to high molecular weight by distillation of the excess of short chain diol. This process is known as "Polycondensation."

Additional ester interchange occurs during this polycondensation which serves to increase the molecular weight and to randomize the arrangement of the copolyetherester units. Best results are usually obtained if this final distillation or polycondensation is run at less than about 5mm. Hg pressure preferably less than about 2mm. Hg and a temperature of about 200°–280°C. preferably about 220°–260°C. for less than about 2 hours, e.g., about 0.5 to 1.5 hours. It is preferred that a stabilizer, preferably 4,4'-bis($\alpha$-dimethylbenzyl) diphenylamine be present during the polycondensation preferably in the amount of about 0.2 to 2.0 percent by weight.

Most practical polymerization techniques rely upon ester interchange to complete the polymerization reaction.

In order to avoid excessive hold time at high temperatures and possible irreversible thermal degradation, a catalyst for the ester interchange reaction should be employed. While a wide variety of catalysts can be employed, organic titanates such as tetra-butyl used alone or in combination with magnesium or calcium acetates are preferred. Complex titanates such as $Mg[HTi(OR)_6]_2$, derived from alkali or alkaline earth metal alkoxides and titanate esters are also very effective. Inorganic titanates, such as lanthanum titanate, calcium acetate/antimonytrioxide mixtures and lithium and magnesium alkoxides, are representative of other catalysts which can be used.

The catalyst should be present in the amount of about 0.005 to 2.0 percent by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Both batch and continuous methods can be used for any stage of copolyether polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

The properties of these stabilized copolyethers can also be modified by incorporation of various conventional inorganic fillers, such as carbon black, silica gel, alumina, rutile, clays and chopped fiber glass. White or light colored fillers are preferred with the nondiscoloring compositions of this invention. In general, these additives have the effect of increasing the modulus of the material at various elongations. Compounds having a range of hardness values can be obtained by blending hard and soft copolyesters of this invention.

The substrates to which the copolyesters described hereinbefore are bonded by the process of this invention may be described as fiber-forming condensation polymers or regenerated cellulose. The phrase fiber-forming condensation polymers is used to indicate that the composition of the substrate can be formed into useful fibers. The phrase is not intented to limit the form of the substrate to fibers or to structures derived from fibers such as threads, cords and fabrics. Other forms of the substrate may be included such as filaments, rods, tubes, films and sheets. Regenerated cellulose is intended to include products such as rayon. All four main types of rayon e.g. acetate, cupraammonium, nitrocellulose and viscose would, of course, fall within the definition of rayon. The process of this invention can also be used to adhere the copolyester to complex or irregular substrate surfaces as long as proper mating surfaces are provided for bonding.

Representative fiber-forming condensation polymers which are intended to be used as substrates in the process of this invention are, as indicated previously, those substances capable of forming fibers. Typically, the fibers are formed at molecular weights of >5000. Specific categories for these include the polyesters, e.g. poly(ethyleneterephthalate) which are discussed at length in the *Encyclopedia of Polymer Science and Technology*, Interscience Publishers, 1969, Vol. 11, Pages 62–128, which are herein incorporated by reference. Other polyesters which are intended to be included within the scope of this invention are poly-(p-hydroxyepoxybenzoate) and poly(cyclohexanedimethyleneterephthalate). Polyamides such as poly(hexamethyleneadipamide), polycaptolactam and poly(11-amino undecanoic acid) are also within the scope of the instant invention. The polyamides are discussed at length in the *Encyclopedia of Polymer Science and Technology*, Supra, Vol. 10, pages 483–597 which are incorporated herein by reference. Polyurethanes such as that derived from hexamethylene diisocyanate and 1,4-butanediol are also included; polyurethanes are discussed in the *Encyclopedia of Polymer Science and Technology*, Supra, Vol. 11, page 506–563 which are also incorporated herein by reference. A discussion of regenerated cellulose is to be found in the *Encyclopedia of Polymer Science and Technology*, Supra, Vol. 11, pages 810–847. This too is herein incorporated by reference.

The polyisocyanate reaction products used in the present process to join the copolyester and the fiber-forming substrate must have an isocyanato group functionality of at least about 2 and have an available isocyanato group content of at least about 2% by weight. The available isocyanato group content can be determined by the procedure of ASTM D1638. The functionality can be determined from the per cent available NCO groups and the average molecular weight of the polyisocyanate composition using the equation:

$$\text{Isocyanato Functionality} = \frac{(\%NCO)(\text{Avg. Mol. Weight})}{4200}$$

The functionality can also be estimated readily for many polyisocyanate reaction products from a knowledge of the amounts and identity of the components used in its preparation.

Aromatic, aliphatic and cycloaliphatic polyisocyanates can be used to prepare the polyisocyanate reaction products when reacted with a variety of polyols and/or polyamines as polyisocyanate compositions in the present invention. The preferred polyisocyanates which can be used to prepare the polyisocyanate reaction product are the $C_8$-$C_{25}$ aromatics, $C_2$-$C_{18}$ aliphatics and $C_5$-$C_{25}$ cycloaliphatics. Representative aromatic polyisocyanates includee 2,4-tolylene diisocyanate, 2,6-tolylene diisocyanate, 4,4'-methylene bis(phenyl isocyanate), 1,3-phenylene diisocyanate, triphenylmethane triisocyanate, 2,4,4'-triisocyanatodiphenyl ether, 2,4-bis(4-isocycnatobenzyl)phenylisocyanate and related polyaryl polyisocyanates, 1,5-naphthalene diisocyanate and mixtures thereof. Representative aliphatic polyisocyanates include hexamethylene diisocyanate, xylylene diisocyanate, 1,12-dodecane diisocyanate and lysine ethyl ester diisocyanate. Representative cycloaliphatic polyisocyanates include 4,4'-methylenebis (cyclohexyl isocyanate), 1,4-cyclohexylene diisocyanate, 1-methyl-2,4-cyclohexylene diisocyanate and 2,4-bis(4-isocyanatocyclohexylmethyl) cyclohexyl isocyanate. The polyisocyanates can be used in refined grades or as undistilled crude products containing varying amounts of phosgenation by-products.

The polyisocyanates can be used to increase the adhesion of the polyesters to various substrates of the instant invention; it has however, been found that the resulting assemblies are stiffened to such an extent that the valuable elastomeric characteristics of the copolyesters are no longer evident.

The polyisocyanate reaction products which are contemplated for use in the process of this invention are those materials which are frequently referred to as adducts and prepolymers. They are customarily obtained by reacting an excess of a polyisocyanate with one or more polyol or polyamines having equivalent weights ranging from about 30 to 2000. Polyols are preferred to polyamines; in particular those polyols having from 2 to 8 OH groups are preferred. An especially preferred class of polyols are those which have an equivalent weight of about 200–1000 of which a part of the polyol is poly(alkylene oxide)glycol or triol. Most preferably at least 50% by weight of the polyol is a poly(alkylene oxide) glycol or triol. The polyamines which are preferred would also have an equivalent weight of about 200–1000 and about 2–3 amino groups.

Representative polyols include ethylene glycol, diethylene glycol, 1,3-butanediol, 1,4-butanediol, dipropylene glycol, trimethylol propane, glycerol, 1,2,6-hexanetriol, pentaerythritol, sorbitol; oxyethylated or oxypropylated derivatives of the foregoing polyols having equivalent weights up to about 2000; polyesters derived from the foregoing polyols and organic dicarboxylic acids such as adipic, sebacic, phthalic and terephthalic acids; polytetramethylene ether glycols; polycaprolactone glycols; oxyethylated and oxypropylated derivatives of nitrogen-containing compounds such as ethylene diamine, ethanol amine, diethanol amine and triethanol amine; and oxyethylated or oxypropylated derivatives of dihydric phenols such as hydroquinone, resorcinol or bis-phenol A. Representative polyamines include ethylene diamine, 1,2-propylene diamine, polyoxypropylene diamines, 1,3-phenylene diamine, 2,4-tolylene diamine, 4,4'-methylene dianiline, 4,4'-methylenebis(2-chloroaniline) and 4,4'-methylenebis(cyclohexyl amine). Polyisocyanate reaction products derived from polyols are preferred because the generally high melting points and low solubilities of the products derived from polyamines makes them more difficult to use in the present process.

Polyisocyanate/polyol reaction products derived from about 1.2 to 4.0, and particularly 1.5–2.2, equivalents of NCO groups per equivalent of OH groups are preferred to use in the present process over other reaction products. This preference is based on convenience in use and the effectiveness of bonding. An especially preferred class of polyisocyanate compositions for use in the present invention are the prepolymers described in U.S. Pat. No. 3,188,302 Lorenz, the disclosure of which is herein incorporated by reference.

The reaction conditions described in the foregoing patent would be satisfactory for the polyisocyanate/polyol reaction.

Any of the polyisocyanate reaction products may be converted to blocked polyisocyanates before use in the present process if bonding is to be accomplished through the action heat. Compounds frequently used for blocking include phenol, cresol, phenylnaphthylamine, methyl ethyl ketone oxime, cyclohexanone oxime and the enol forms of acetylacetone and acetoacetic ester.

The polyisocyanate reaction product may be employed directly in bond formation if its physical form is suitable; it may however be dissolved in a suitable solvent which is not reactive with isocyanate groups to permit or to assist the preparation of bonds. In the case of blocked isocyanates, aqueous emulsions or dispersions of the polyisocyanate composition may also be used.

Bond formation between the thermoplastic copolyester and the fiber-forming substrate is accomplished by applying the polysiocyanate composition to either or both the copolyester and the fiber-forming substrate, contacting the surfaces involved and maintaining contact until bonding occurs under the action of heat and/or pressure. Because of the large number of applications in which the present process may be employed, the methods of applying the polyisocyanate composition and forming the bond can be varied considerably. In general however, these methods are conventional. With polyisocyanate compositions of suitable viscosity, brushing, spraying and roll coating are typical means of application which can be employed. If the polyisocyanate composition has a low viscosity (with or without the use of solvents), the substrate can be coated by immersion with excess material being removed by means such as squeeze rolls, doctors knives or simple draining. Dispersions of solid polyisocyanate compositions generally have low enough viscosity to be applied by immersion methods. In those instances where it is desirable to limit the penetration of the polyisocyanate composition, such as in bonding a copolyester cover to poly(ethylene terephthalate) fiber braid on a hose, more viscous polyisocyanate compositions can be used to advantage. Many isocyanato-terminated prepolymers have sufficient viscosity as such but if necessary thickening agents such as finely divided silica can be used to raise the viscosity. Such viscous material can be applied in controlled amounts by transfer coating or by doctoring.

Actual bond formation is accomplished by contacting the thermoplastic copolyester and the fiber-forming substrate under the action of pressure with or without heating after application of the polyisocyanate composition. If the bond is to be formed at ambient temperatures, the application of sufficient pressure to maintain contact usually must be continued for a period of about 12 to 120 hours. The time required to form satisfactory bonds can be reduced by increasing the temperature at which contact is made. By operating at temperatures near the melting point of the thermoplastic copolyester; that is, about 160°C. to 230°C., bonding can be accomplished with the application of pressure in about 1 to 10 minutes. Generally, ambient temperature up to temperatures near the melting point of the copolyester may be employed. Pressure may vary from 1 to 200 psi but if desired higher pressures can be utilized if for instance uneven surfaces are to be bonded. A particularly convenient method of bonding involves applying the polyisocyanate composition to a fiber forming substrate such as woven cloth or braid on a hose tube and immediately applying molten thermoplastic copolyester by doctoring or cross head extruding onto the polyisocyanate coated substrate. Bond formation proceeds with sufficient rapidity under those conditions that bonding can be effected by the time the thermoplastic copolyester has solidified.

If a solvent solution or aqueous dispersion of polyisocyanate composition has been used, it is preferred that the solvent or water be removed before contacting the copolyester and the fiber-forming substrate.

The method of the present invention is particularly useful for preparing compositions useful in reinforced structures such as braided hose, flat belting, V-belts and coated fabrics. In these applications, the use of isocyanate-terminated prepolymers is particularly advantageous and permits a wide latitude in handling and processing procedures. As indicated, bond formation with prepolymers can be accomplished almost immediately by heating or at room temperature over an extended time period. The structures prepared with prepolymers are more flexible than those prepared from conventional adhesives such as epoxies which rigidize the structures. When low temperature flexibility is a consideration, the rubberlike characteristics of the prepolymer system again provides a decided advantage over other adhesive systems including simple polyisocyanates.

All parts, proportions and percentages disclosed herein are by weight unless otherwise indicated. The following examples further illustrate the invention.

EXAMPLES

Copolyester A is prepared by ester interchange of 4.53 moles of dimethyl terephthalate hereinafter (DMT), 1.27 moles of dimethyl isophthalate hereinafter (DMI), 1.0 mole of polytetramethyleneether glycol hereinafter (PTMEG-980) (having a number average molecular weight about 980) and excess 1,4-butanediol in the presence of a tetrabutyl titanate/magnesium acetate catalyst and a stabilizer [sym-di-beta-naphthylphenylene diamine or 1,3,5-trimethyl-2,4,-6-tri(3,5-di-tert-butyl-4-hydroxybenzyl)benzene]. Ester interchange is conducted at atmospheric pressure up to a final temperature of 220°C. The ester interchange is followed by polycondensation at 250°C. at about 1 Torr for about 90 minutes. At higher pressures a product having a lower inherent viscosity will be produced but a higher rate or production will be obtained. Conveniently pressures of less than about 5 Torrs are employed. The resulting polymer has an inherent viscosity of about 1.45–1.55. Sheets (6 × 6 × 0.075 inches) are prepared from granulated copolyester by compression molding for 1 minutes at about 220°C. and cooling rapidly to room temperature. These sheets are used in the adhesive tests described in the following examples.

Copolyester B is prepared by ester interchange of 7.85 moles of DMT, mole PTMEG-980 and excess 1,4-butanediol using ester interchange and polycondensation conditions and catalyst described for the preparation of Copolyester A. Copolyester B has an inherent viscosity of about 1.20–1.45. Sheets are prepared from this copolyester by compression molding at about 180°C. as described for Copolyester A.

Inherent viscosities of the copolyesters described hereinbefore are measured at 30°C. at an concentration of 0.5 g./dl in a mixed solvent of 60 parts liquid phenol (90% phenol; 10% water) and 40 parts of 1,1,2-trichloro-ethane.

Prepolymer A is prepared by reacting 346 parts of tolylene diisocyanate (80% 2,4-isomer; 20% 2,6-isomer) with a mixture of 45 parts of 1,3-butanediol and 490 parts of polytetramethyleneether glycol (number average molecular weight 980) for about 4 hours at 80°C. It has an available NCO content of about 9.4% by weight.

Prepolymer B is prepared by reacting 348 parts of 2,4-tolylene diisocyanate with 980 parts of polytetramethyleneether glycol (number average molecular weight 980) for 4 hours at 80°C. It has an available NCO content of 6.3%.

EXAMPLE 1

1-A. A thin coating of Prepolymer A was applied to a 6 × 6 inch square of poly(ethylene terephthalate) woven fabric (7.5 oz/sq. yd.) and a 6 × 6 × 0.075 inch sheet of Copolyester B was placed on the coated side of the fabric. This assembly was placed between steel plates at a temperature of about 230°C. for 5 minutes at a pressure of 0.65 psi. It was then removed from the plates and allowed to cool to room temperature. After standing for 1 day at room temperature, the 180° peel strength of the assembly at 25°C. was 55 pli when the sample was pulled at a rate of 2 inch/min.

When the assembly was prepared by the same procedure, but Prepolymer A is omitted, the 180° peel strength was 13 pli.

1-B. The procedure of 1A was repeated using Prepolymer B in place of Prepolymer A. The 180° peel strength was 37.5 pli.

1-C. The procedure of 1-A is repeated using a poly(cyclohexanedimethylene terephthalate) fabric; substantially similar results are obtained.

1-D. The procedure of 1-B was repeated except that poly(hexamethylene adipamide) woven fabric (6 oz./sq.yd.) was used in place of the poly(ethylene terephthalate) fabric. The 180° peel strength was 32 pli. In the absence of any isocyanate composition, the peel strength was about 6 pli.

1-E. The procedure of 1-A was repeated except that Copolyester A was used in place of Copolyester B and the temperature at which the assembly was pressed was lowered from 230°C to 205°C. The assembly had a peel strength of 25 pli. A control omitting Prepolymer A had a peel strength of 15 pli.

EXAMPLE 2

2-A. A thin coating of Prepolymer A was applied to a 6 × 6 inch square of poly(ethylene terephthalate) woven fabric (7.5 oz./sq.yd.) and a 6 × 6 × 0.075 inches sheet of Copolyester B was placed on the coated side of the fabric. This assembly was placed between steel plates at about 25°C for 7 days at a pressure of about 0.70 psi. The 180° peel strength of the assembly is at 25°C is 17 pli. When Prepolymer A was omitted, there was no adhesion between the Copolyester sheet and fabric.

2-B. The procedure of 2-A was repeated with the exception that Prepolymer B is used in place of Prepolymer A. The 180° peel strength was 15 pli.

What is claimed is:

1. A method of bonding (1) a segmented thermoplastic copolyester composition consisting essentially of a multiplicity of recurring long chain ester units and short chain ester units joined head-to-tail through ester linkages, said long chain ester units being represented by the formula I 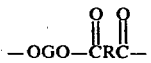

and said short chain units being represented by the formula

II 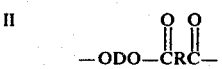

where G is a divalent radical remaining after the removal of terminal hydroxyl groups from a poly(alkylene oxide) glycol having a molecular weight of about 400–6000 and a carbon to oxygen ratio of about 2.0–4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short chain ester units amount to about 15–95 percent by weight of said copolyester, and at least about 50% of said short chain ester units are identical and (2) a substrate selected from the group consisting of fiber-forming condensation polymers or regenerated cellulose which comprises applying to either said copolyester or said substrate a polyisocyanate reaction product having an available isocyanato group content of at least 2 percent and being obtained by reacting an excess of a polyisocyanate with a liquid polyol or a polyamine having an equivalent weight of about 30–2000 and then contacting said copolyester and said substrate in the presence of either elevated pressure and/or temperature.

2. The process of claim 1 wherein said substrate is a fiber-forming condensation polymer selected from the group consisting of polyesters, polyamides and polyurethanes.

3. The process of claim 1 wherein said substrate is rayon.

4. The process of claim 1 wherein said substrate is a poly(ethylene terephthalate).

5. The process of claim 1 wherein said substrate is a poly(hexamethylene adipamide).

6. The process of claim 1 wherein said polyisocyanate reaction product is formed by reacting a polyol having 2 to 8 OH groups with an excess of polyisocyanate.

7. The process of claim 6 wherein said polyol has an equivalent weight of 200–1000 and at least 50 percent by weight of the polyol is a poly(alkylene oxide) glycol or triol.

8. The process of claim 1 wherein the polyisocyanate reaction product is formed by reacting a polyisocyanate with a polyamine having an equivalent weight of 200–1000 and about 2–3 amino groups.

9. The process of claim 1 wherein said contacting takes place at a temperature of about 160°–230°C.

10. The process of claim 1 wherein said dicarboxylic acid is selected from the group consisting of phthalic acid, terephthalic acid, isophthalic acid, their esters and mixtures thereof.

11. The process of claim 1 wherein the poly(alkylene oxide) glycol is poly(tetramethylene oxide) glycol having a molecular weight of about 600–2000.

12. The process of claim 1 wherein said glycol is poly(tetramethylene oxide) glycol having a molecular weight of about 600–2000, said dicarboxylic acid is dimethyl terephthalate and said diol is 1,4-butanediol.

13. The process of claim 1 wherein said dicarboxylic acid is a mixture of dimethyl terephthalate and a maximum of 30 mole per cent of dimethyl isophthalate, dimethyl phthalate or mixtures thereof.

14. The product of claim 1.
15. The product of claim 2.
16. The product of claim 7.

* * * * *